Sept. 16, 1941.                K. L. SMITH                    2,256,358
                           SCREENING APPARATUS
                           Filed July 31, 1939           4 Sheets-Sheet 1
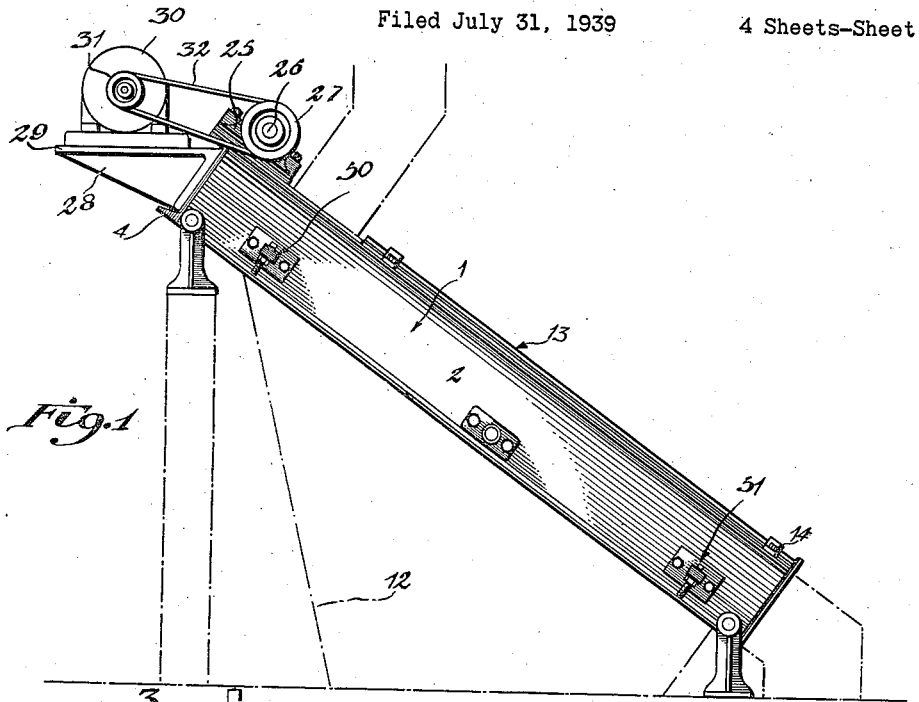
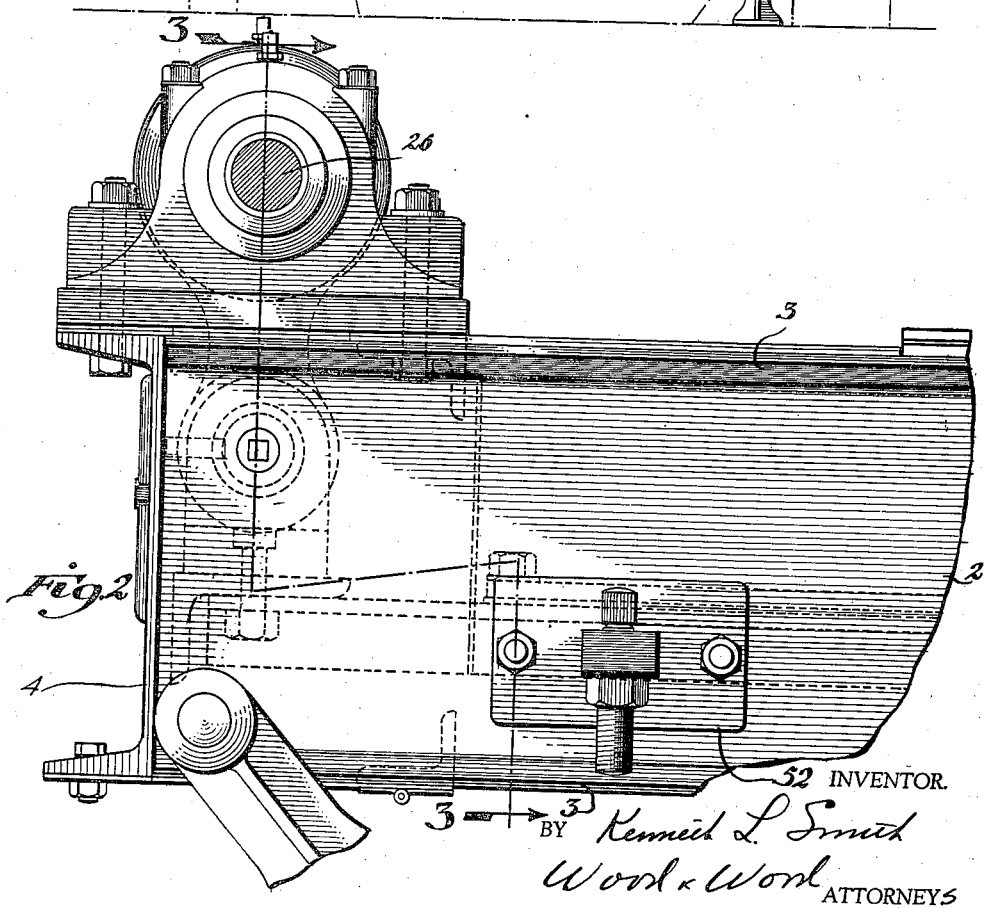
INVENTOR.
BY Kenneth L. Smith
Wood & Wood ATTORNEYS

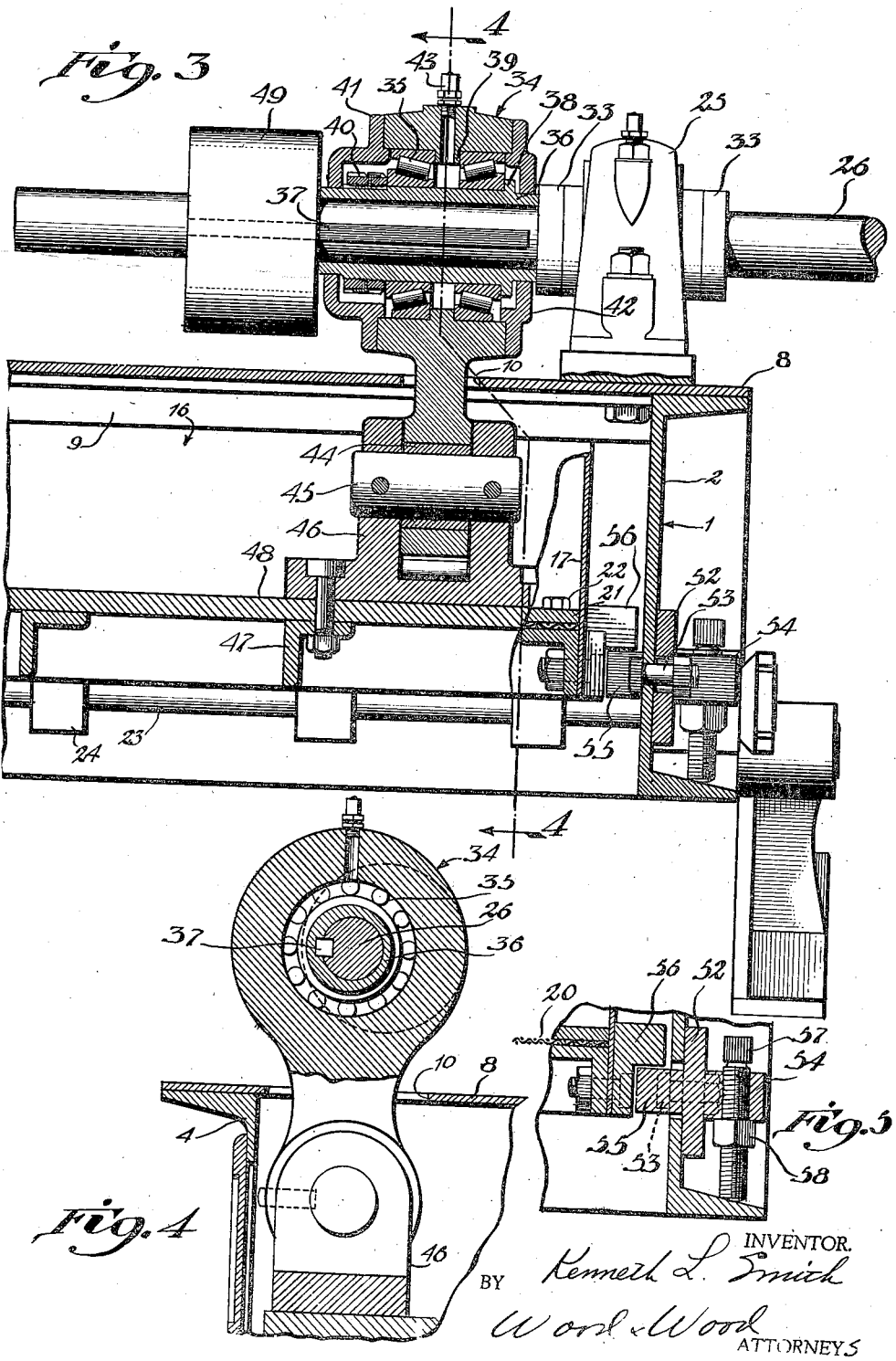

Sept. 16, 1941.   K. L. SMITH   2,256,358
SCREENING APPARATUS
Filed July 31, 1939     4 Sheets-Sheet 3
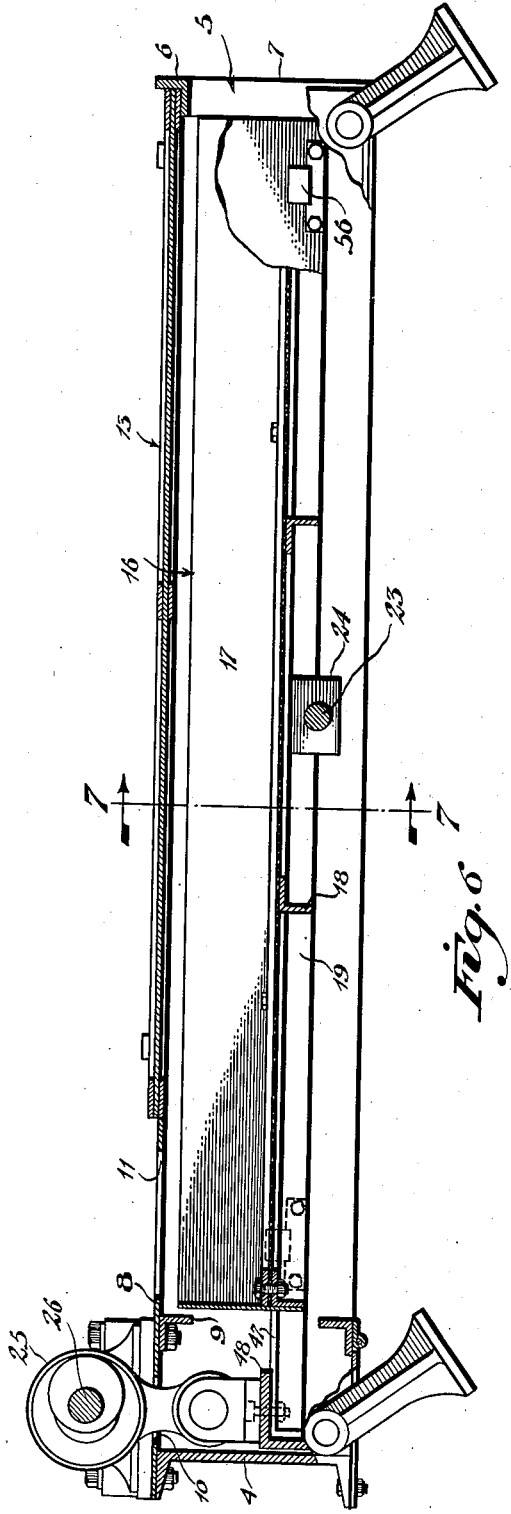
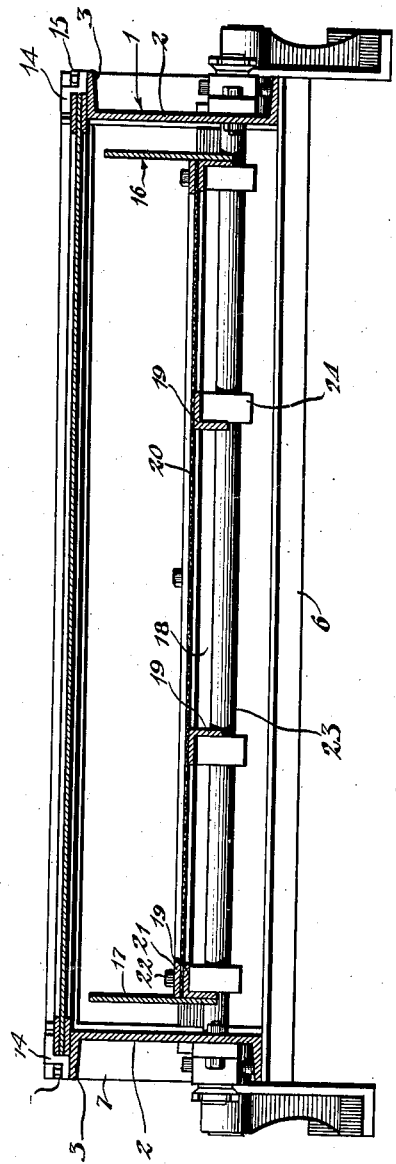
INVENTOR.
Kenneth L. Smith
BY Wood & Wood
ATTORNEYS Sept. 16, 1941. K. L. SMITH 2,256,358
SCREENING APPARATUS
Filed July 31, 1939 4 Sheets-Sheet 4
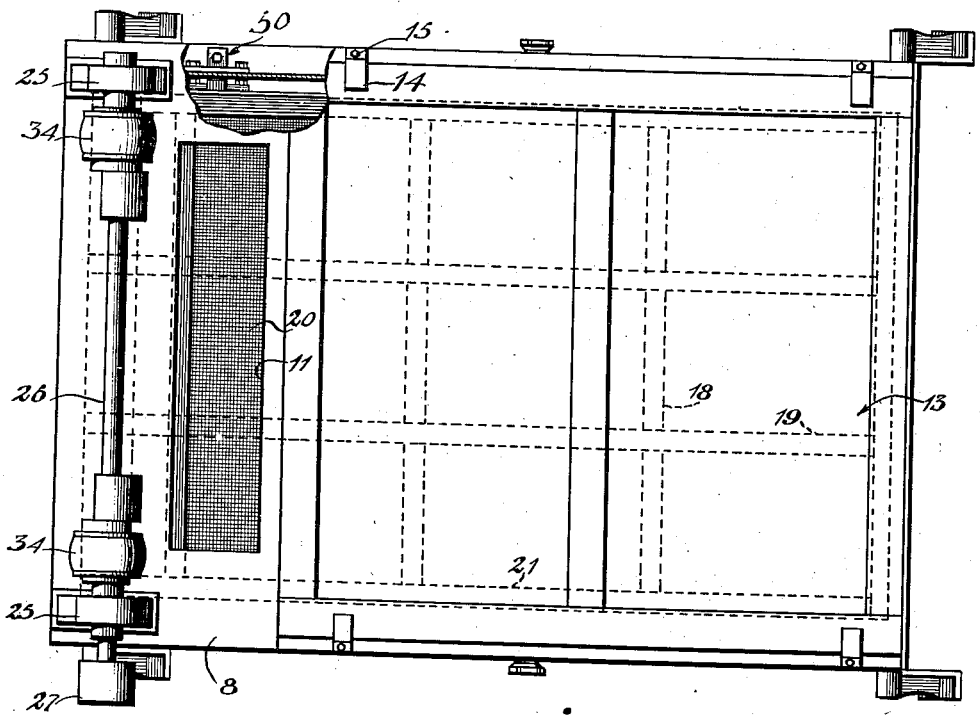
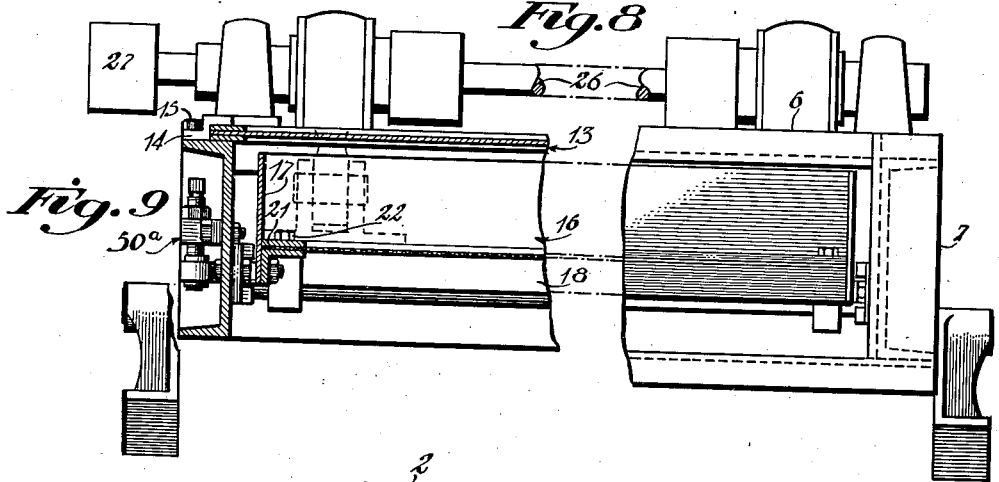
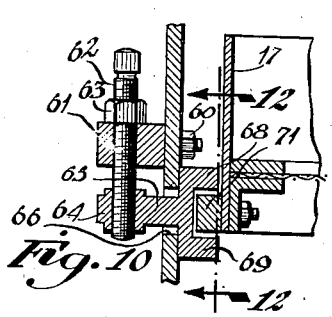
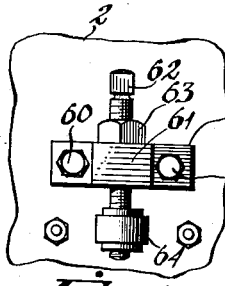
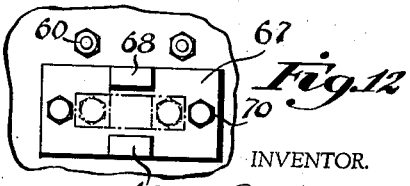
INVENTOR.
BY Kenneth L. Smith
Wood & Wood ATTORNEYS Patented Sept. 16, 1941

2,256,358

UNITED STATES PATENT OFFICE 2,256,358

SCREENING APPARATUS

Kenneth L. Smith, Aurora, Ind., assignor to Stedman's Foundry & Machine Works, Aurora, Ind., a corporation of Indiana Application July 31, 1939, Serial No. 287,532

4 Claims. (Cl. 209—349)

This invention relates to screens for separating differently sized particles of material, for sifting and similar purposes.

An objective of the invention has been to provide a machine suited specifically for handling relatively large volumes of material rapidly, and for handling materials which ordinarily are difficult to sift or screen, without clogging of the screening membrane, in order that substances of the type found in the commercial fertilizer, rendering, and chemical industries can be handled easily and conveniently.

The machines of the invention are principled upon the concept of employing a mechanically actuated screen member, and of providing positive stops in positions of the screen member so as to stop it from proceeding farther in the same direction of travel. When the screen member, being driven or oscillated mechanically, strikes a positive stop abruptly, an intense vibration is produced throughout the screen membrane. By virtue of this action, the vibrations of the screen are not dampened by heavy loads, and the membrane does not become clogged or "blinded" when sticky, greasy, or semi-wet materials are being sifted.

According to the preferred embodiment of the invention, the screen membrane is carried in a relatively rigid frame; and the membrane is removably inserted in the tray so that it can be changed quickly and conveniently. The tray itself preferably is built of heavy metal members, and is pivoted or hinged for movement relative to the frame of the machine. The positive stops are located upon the frame in the path of movement of the tray, and these, therefore, serve to stop the tray abruptly either as it moves in one direction or the other, or, better still, in both directions. The mechanical means for driving the screen tray is located on the frame, and preferably is comprised of an eccentrically coupled link for producing tray oscillation.

These and other features of the invention are shown in the drawings which illustrate a preferred structure. From the foregoing description of the principles of the invention and the following description of a preferred embodiment of it, those skilled in the art will readily understand the modifications to which it is susceptible.

The stops normally are fixed in position, but they preferably are adjustable relative to the travel of the tray, in order to vary the vibration, as well as to coordinate the intervals at which the tray is blocked against further movement in a given direction by the driving forces by which the tray is actuated.

In the drawings, Figure 1 is a side elevation of the machine.

Figure 2 is an enlarged fragmentary view showing the mounting of the mechanical driving mechanism and the external arrangement for one of the adjustable stops.

Figure 3 is a cross-sectional view taken on the line 3—3 of Figure 2.

Figure 4 is a cross-sectional view through the eccentric drive shaft taken on the line 4—4 of Figure 3.

Figure 5 is a fragmentary sectional view taken through one of the adjustable positive stops.

Figure 6 is a longitudinal view through the machine and shows the relative arrangement of the tray and drive mechanism within the frame.

Figure 7 is a cross-sectional view taken on the line 7—7 of Figure 6.

Figure 8 is a top plan view of the machine.

Figure 9 is another view illustrating particularly the details of another positive stop arrangement, in section and elevation.

Figure 10 is an enlarged fragmentary sectional view of the positive stop illustrated in Figure 9.

Figure 11 is an elevation of the stop shown in Figure 9, taken from the exterior of the frame of the machine.

Figure 12 is an elevation taken on the line 12—12 of Figure 10.

In the drawings, the frame of the machine is indicated generally at 1. This frame is comprised of side channels 2, of which the flanges 3 extend in the outward direction. The side channels are cross-connected by an end channel 4, at the one end, and to a tailings discharge frame 5 at the other end. The frame 5 is composed of angle iron elements 6—6, and 7—7 which are bolted together, or welded, and secured to the side channels 2. Side channels 2 also may pivotally carry pedestals at the opposite ends, so that the frame can be disposed on an incline as shown in Figure 1.

A cover plate 8 extends from one side channel to the other, the one edge of it being fastened to a flange on the end channel 4 and is supported medially by a lateral brace 9. The cover plate has apertures 10—10 through which the drive mechanism operates and it also has an aperture 11 for the admission of material being screened. The bottom of the frame is open for communication of the screenings to a trough or suitable collector indicated diagrammatically at 12.

A removable cover which is indicated generally at 13 serves to enclose the remainder of the upper face of the frame. This cover is secured to the frame by means of the Z-lugs 14 which are bolted to the upper faces of the flanges 3, as at 15. The lower edge of the cover rests in the angle iron 6 of the discharge frame.

A screen tray, indicated generally at 16, is mounted within the frame 1. The frame is comprised of side and end elements 17 forming a rectangular tray, the lower end of which is open for the discharge of tailings through the frame 5. Lateral braces 18 and longitudinal braces 19 serve to stiffen the tray and also to support thereon a screen membrane 20.

The screen membrane may be of metal cloth or wire, or of perforated or foraminous material, depending upon the material to be sifted. The membrane is held in position by means of the frame 21, which is connected to the marginal stiffening elements 18 and 19 by means of the bolts 22.

In the preferred structure, the tray oscillates upon a rock shaft 23 which is supported from the side channels 2. The rock shaft 23, as shown in the drawings, is located centrally of the length of the tray, so that as one end of the tray moves up, the other end moves down, and vice versa. However, if desired, the rock shaft may be located at other points along the length of the frame for pivotal movement, depending upon whether or not the vibrations of the screen are to be localized at any particular portion of it, or distributed uniformly over its surface. It will also be understood by those skilled in the art that the tray may be reciprocated sidewisely or other types of oscillation may be imparted to it, if desired.

Support blocks 24 are carried by the rock shaft in position for engagement with the longitudinal angles 19 and are fastened thereto.

Mechanical drive

At each side of the machine a pillow block 25 is mounted upon the cover plate 8, as shown in Figure 3. These pillow blocks journal a drive shaft 26, which is provided at the one side with a pulley 27. A bracket 28 is fastened to the end member 4 of the frame, so as to provide a table 29 upon which a motor 30 is mounted. The motor carries a pulley 31 which engages a belt 32 for driving the pulley 27 of the drive shaft.

At each side of the drive shaft, a collar, or pair of collars 33, is located on either side of the pillow block, for preventing the shaft from moving axially. Inwardly of the collars at each side of the machine, connecting rods 34—34 respectively, are mounted. Each rod is bored at its head end to receive anti-friction bearings 35, 35 journalling an eccentric sleeve 36. The eccentric sleeve is keyed to the drive shaft 26 by means of the key 37.

At the one end, the eccentric sleeve carries a collar portion 38. The anti-friction bearing elements 35 are located upon opposite sides with the central annular ring portion 39 in the bore of the head of the rod. The collar 38 engages an exterior face of one of the anti-friction elements, while the exterior face of the other is in abutment with one of a pair of lock nuts 40, threadedly carried by the sleeve 36. This arrangement serves to keep the anti-friction elements located and aligned in the connecting rod.

Caps 41 and 42 form an oil-tight housing for the anti-friction elements within the bore of the head of the rod; and an oiling cap 43 is provided for the lubrication of the bearings.

The lower ends of the connecting rods 34 are bored to carry sleeve bearings 44 which serve to journal wrist pin elements 45. Each wrist pin is carried by a pillow block 46 and both are fastened to an extension, or projection, 47 of the tray 16. A brace element 48 interconnects the extensions 47 and also serves as a table to which the pillow blocks are fastened. Adjacent each connecting rod, a counterbalance 49 is provided upon the drive shaft 26. These are dead-weight members which are bored eccentrically and keyed to the shaft, so that they counteract the rotational eccentricity of the connecting rod upon the shaft.

When the drive shaft 26 is rotated, therefore, the eccentric collars 36 cause oscillation of the connecting rods 34, and these, in turn, cause oscillation, or rocking movement, of the tray 16. The degree of eccentricity of the collar 36 determines the degree of oscillation of the tray.

Positive stop arrangement

Adjacent each end of the tray 16 at each side, positive stop assemblies, 50 for the one end and 51 for the other, are located. The stop elements of these assemblies are so positioned that the tray strikes them at or near the completion of the course of travel in a given direction were it oscillated freely by the driving mechanism. The abruptness of the stoppage of the tray causes vibration in the screen and the sifting action therefore is accentuated, the tray "giving" sufficiently to prevent binding of the parts. The stop elements are adjustable as to position, so that the point or points of impact can be coordinated with the relative course of travel of the tray in the one direction or the other, and the "give" or elasticity of it; otherwise a binding action might take place with attendant damage to the driving mechanism.

In the drawings, two stop arrangements are shown. The stop assemblies 50 serve to stop the screen in one direction of its course of travel, e. g. downwardly; and the stop assemblies 50a are arranged to stop the screen in both directions of its travel course. These assemblies are described in detail as follows: The stop assemblies 50 are comprised of bolster plates 52, one for each assembly. Each bolster plate is fastened to its corresponding side channel by the bolts 53, as shown in Figure 2. The bolts are situated in slots in the bolster plate so that the plate can be adjusted to limit the movement of the screen and the bolts then tightened to lock the plate in position.

Lugs 54 and 55 (Figure 5) extend from the opposite faces of each bolster plate 52. One of these lugs 55 passes through an appropriate aperture in the side channel 2 and extends inwardly of the channel, and into the path of travel of an abutment lug 56 which is bolted to the tray. The other lug 54 is bored and threaded to receive a cap screw 57 carrying a lock nut 58. The cap screw extends into abutment with a flange 3 of the side channel. Thus when the lock nut 58 and the nuts on the bolts 53 holding the bolster plates are loosened the cap screw can be turned so as to adjust the position of the lug 55 relative to the course of travel of the fixed lug 56 on the tray.

As will be noticed, the adjustment is made from the exterior of the machine, not from the interior, and therefore no dismantling of the machine is required.

The other type of positive stop assembly is shown particularly in Figures 10, 11 and 12. According to this arrangement, a bolster plate 59 is fixed to the side channel of the frame by means of the bolts 60. This plate carries a lug 61 extending outwardly; the lug 61 is bored and threaded to receive a cap screw 62 which carries a lock nut 63, and which extends into threaded engagement with a lug 64 of an adjustable stop member 65. The adjustable stop 65 extends through an aperture 66 in the side plate 2, and carries a plate 67 from which upper and lower stop lugs 68 and 69 extend interiorly of the machine. Plate 67 is locked in position to the side frame by means of the lock bolts 70—70.

When the lock bolts 70—70 and the lock nut 63 are loosened, the plate 67 is relatively movable; and the cap screw 62 can then be turned to adjust the position of the lugs 68 and 69, after which the plate can be relocked in position.

The lugs 68 and 69 cooperate with a lug 71 carried on the tray 16. Lugs 68 and 69 are not movable relative to one another, but movable relative only to the tray lug 71. These lugs, however, are spaced a predetermined distance, depending upon the throw of the lower end of the tray at this point. If desired, the lugs 68 and 69 can be made relatively movable, although, where the throw is fixed, this arrangement is not necessary.

During the operation of the machine, the head end of the tray, that is the end adjacent the driving mechanism, is caused to strike the stop lugs 69 as this end moves downwardly. The stop mechanism at the lower end is adjusted so that the lugs 71 will strike the corresponding upper lugs 68 at the same instant, so that the simultaneous impacts at the opposite ends of the tray will cause an intense vibration of the screen. Upon the reverse movement, the opposite effect takes place. While no stop on the upward throw at the upper end is provided in the structure shown in the drawings, since the screen at this end receives an additional vibration from the mechanical drive, such stop can be employed at the upper end on the upward throw, if necessary or desired.

Having described my invention, I claim:

1. A screening device comprising a frame including side members having flange portions extending outwardly therefrom, a tray having a foraminous membrane rockably mounted between said side members, drive means for rocking said tray, and means for abruptly stopping and thereby vibrating the tray as it approaches reversal positions in its rocking movement, said means including lug members mounted on said tray at opposite sides thereof, stop members having portions respectively extending through said side members in the paths of movement of said stop members, and also having portions extending externally of said side members for carrying adjustment screws, and adjustment screws extending through said portions into engagement with said flange portions of said side members.

2. A screening device comprising a pair of side members having apertures adjacent the ends thereof, and having outwardly extending flange portions adjacent said apertures, a tray carrying a foraminous membrane, rockably mounted intermediate said side members, means for rocking said tray, abutment means extending sidewisely from said tray toward said side members respectively, stop means positioned respectively in said apertures, each having members disposed upon opposite sides of said abutment means and each also having a portion respectively externally of said side members, adjustment screws carried by said portions extending externally of the side members, with the screws extending into engagement with said flange portions and means for fastening said stop members in position after adjustment of said screws.

3. A screening device comprising a pair of oppositely arranged channel members in spaced relationship, a tray having a screen rockably mounted intermediate said channel members, stop means comprising abutment lugs carried adjacent corners of the screen, the side members having apertures therethrough adjacent said abutment lugs, and stop units having portions extending through said apertures in the paths of movement of said abutment lugs, and having extension portions positioned externally of said side members, screw means carried by said extension portions for engagement with the channels of said channel members, and means for locking said stop members to said side members after they have been adjusted to predetermined positions relative to said abutment lugs.

4. A screening device which comprises a pair of side members in spaced relationship, a screen member rockably mounted intermediate said side members, abutment members extending from the tray toward the side members respectively, at opposite sides of its rocking axis, the side members having apertures substantially in alignment with the paths of movement of the abutment members, stop means extending through said apertures and positioned to be struck by said abutment members as the tray is rocked back and forth, said stop members including portion extending externally of said side members and having adjustment screws for engagement therewith and flange portions adapted to be bolted to said side members for locking said stop members in position after they have been adjusted.

KENNETH L. SMITH.